United States Patent
Adderly et al.

(10) Patent No.: US 8,661,221 B2
(45) Date of Patent: Feb. 25, 2014

(54) LEASING FRAGMENTED STORAGE BETWEEN PROCESSES

(75) Inventors: Darryl M. Adderly, Morrisville, NC (US); Anbumunee Ponniah, Chennai (IN); Sangita A. Ghodasara, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/049,236

(22) Filed: Mar. 16, 2011

(65) Prior Publication Data

US 2012/0239899 A1   Sep. 20, 2012

(51) Int. Cl.
   *G06F 12/02*   (2006.01)
(52) U.S. Cl.
   USPC ......................................... 711/170
(58) Field of Classification Search
   None
   See application file for complete search history.

(56) References Cited

U.S. PATENT DOCUMENTS

| | | | | |
|---|---|---|---|---|
| 4,775,932 A * | 10/1988 | Oxley et al. | ........................... | 1/1 |
| 4,989,134 A * | 1/1991 | Shaw | ................................... | 1/1 |
| 5,784,699 A * | 7/1998 | McMahon et al. | ............ | 711/171 |
| 6,505,283 B1 * | 1/2003 | Stoney | ........................... | 711/170 |
| 6,804,761 B1 * | 10/2004 | Chen et al. | .................... | 711/170 |
| 6,862,666 B2 * | 3/2005 | Chong et al. | ................... | 711/152 |
| 7,231,504 B2 | 6/2007 | Kashyap et al. | | |
| 7,310,718 B1 * | 12/2007 | Liang et al. | ..................... | 711/170 |
| 7,552,271 B2 * | 6/2009 | Sinclair et al. | ................ | 711/103 |
| 7,721,065 B2 | 5/2010 | Tsuji | | |
| 8,417,912 B2 * | 4/2013 | Olszewski et al. | ............ | 711/173 |
| 2004/0083333 A1 * | 4/2004 | Chang et al. | ................. | 711/103 |
| 2007/0033329 A1 * | 2/2007 | Sinclair et al. | ................ | 711/103 |
| 2007/0130419 A1 * | 6/2007 | Blacquiere et al. | ........... | 711/111 |

FOREIGN PATENT DOCUMENTS

EP   0706130 A1   4/1996

* cited by examiner

*Primary Examiner* — Matthew Bradley
*Assistant Examiner* — Ramon A Mercado
(74) *Attorney, Agent, or Firm* — Stephen R. Tkacs; Stephen J. Walder, Jr.; Libby Z. Toulo

(57) ABSTRACT

A mechanism is provided for leasing fragmented storage between processes. The mechanism comprises a fragmented memory manager associated with instances of virtual memory managers to provide a pool of memory that may lease from the owners of the memory and in turn sub-let the memory for use by other processes or owners. The mechanism allows programs to operate under normal conditions until fragmentation sets. A different memory manager leases those fragmented memory blocks from processes to create a virtually contiguous block of memory that it can sub-lease to processes in need of temporary expansion beyond the memory available for the processes under normal circumstances.

20 Claims, 5 Drawing Sheets

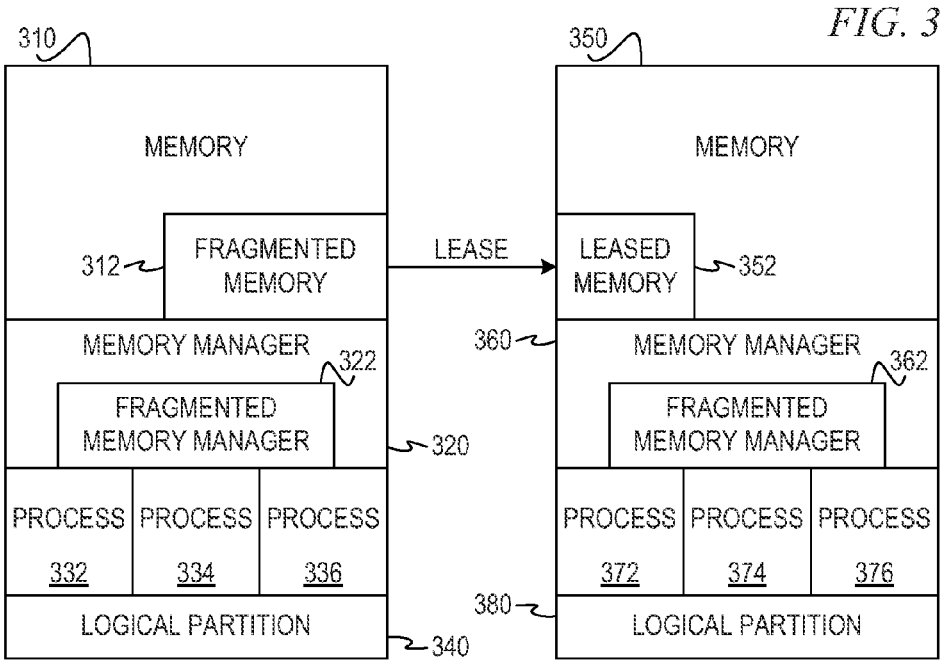
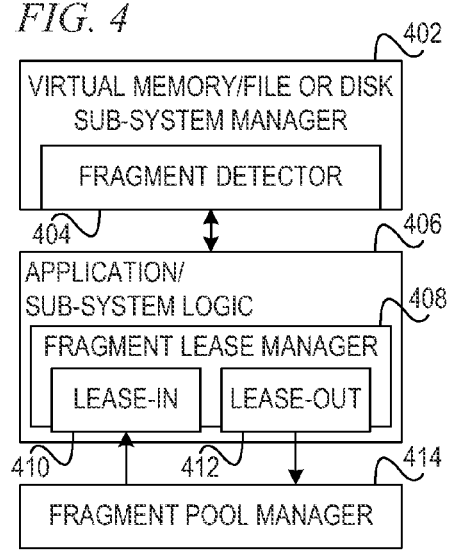
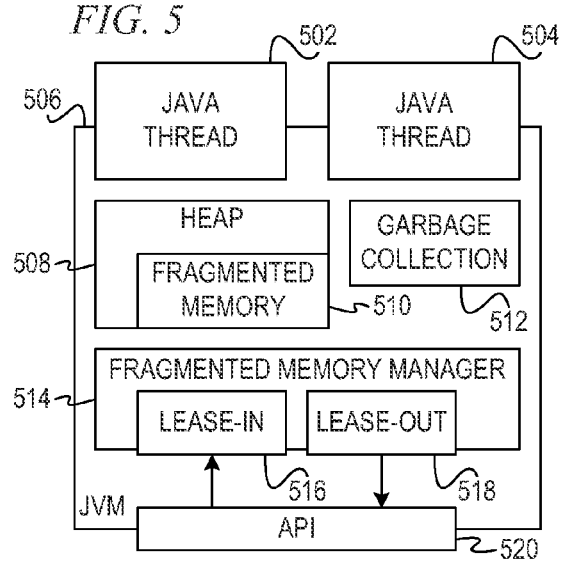

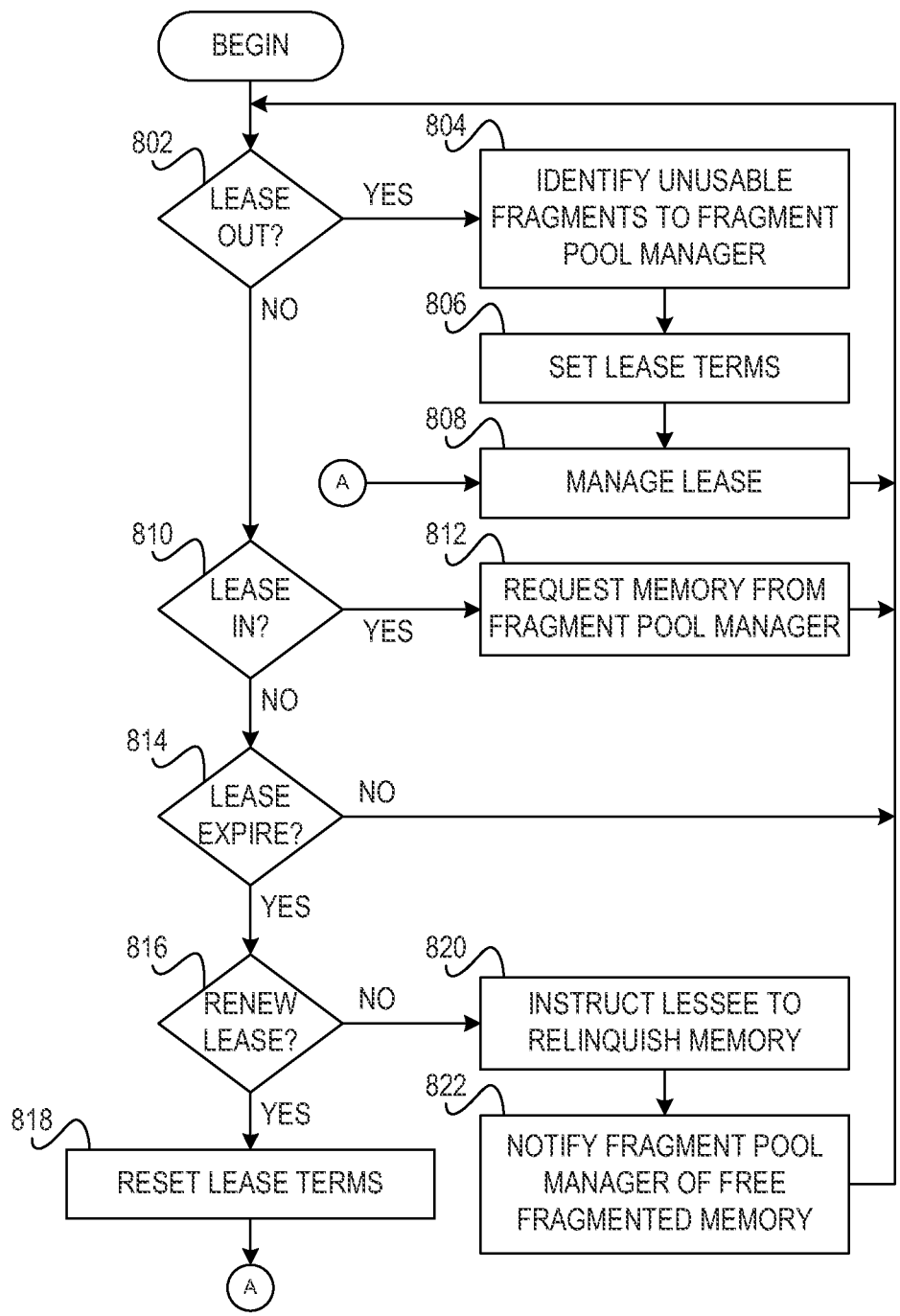

LEASING FRAGMENTED STORAGE BETWEEN PROCESSES

BACKGROUND

The present application relates generally to an improved data processing apparatus and method and more specifically to mechanisms for leasing fragmented storage between processes.

Fragmentation is a phenomenon in which free storage becomes divided into many small pieces over time. Fragmentation is a weakness of certain storage allocation algorithms, occurring when an application allocates and de-allocates regions of storage of varying sizes, and the allocation algorithm responds by leaving the allocated and de-allocated regions interspersed. The result is that although free storage is available, it is effectively unusable because it is divided into pieces that are too small to satisfy the demands of the application. The term "external" refers to the fact that the unusable storage is outside the allocated regions.

For example, in dynamic memory allocation, a block of 1000 bytes might be requested, but the largest contiguous block of free space has only 300 bytes. Even if there are ten blocks of 300 bytes of free space, separated by allocated regions, one still cannot allocate the requested block of 1000 bytes, and the allocation request will fail. Fragmentation also occurs in file systems as many files of different sizes are created, change size, and are deleted. The effect is even worse if a file that is divided into many small pieces is deleted, because this leaves similarly small regions of free spaces.

Modern computer systems have memory management units that avoid fragmentation by creating a more granular allocation strategy or by providing abstraction that makes virtual memory addresses appear contiguous even when physical addresses cannot be. This usually results in higher latency due to extra cycles needed to accomplish the allocation strategy. In normal operating environments, fragmentation continues to occur.

SUMMARY

In one illustrative embodiment, a method, in a data processing system, is provided for leasing fragmented storage between processes. The method comprises responsive to a first process running in the data processing system marking a fragment of storage as being leased out, adding, by a fragment pool manager running in the data processing system, the fragment of storage to an unallocated storage pool. The method further comprises responsive to a request to lease a portion of storage from a second process, constructing, by the fragment pool manager, one or more blocks of storage. The method further comprises allocating, by the fragment pool manager, the one or more blocks of storage to the second process and managing, by the fragment pool manager, access to the one or more blocks of storage by the second process.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating a logical partitioned data processing system with leased fragmented memory between processes in accordance with an illustrative embodiment;

FIG. 4 is a block diagram depicting a mechanism for leasing fragmented storage between processes in accordance with an illustrative embodiment;

FIG. 5 is a block diagram depicting a mechanism in a virtual machine for leasing fragmented storage between processes in accordance with an illustrative embodiment;

FIG. 8 is a flowchart illustrating operation of a fragment lease manager in accordance with an illustrative embodiment.

DETAILED DESCRIPTION

The illustrative embodiments provide a mechanism for leasing fragmented storage between processes. The mechanism comprises a fragmented storage manager associated with instances of virtual memory managers to provide a pool of storage that may lease from the owners of the storage and in turn sub-let the storage for use by other processes or owners. The mechanism allows programs to operate under normal conditions until fragmentation sets. A different storage manager leases those fragmented storage blocks from processes to create a virtually contiguous block of storage that it can sub-lease to processes in need of temporary expansion beyond the storage available for the processes under normal circumstances.

Figure 1:
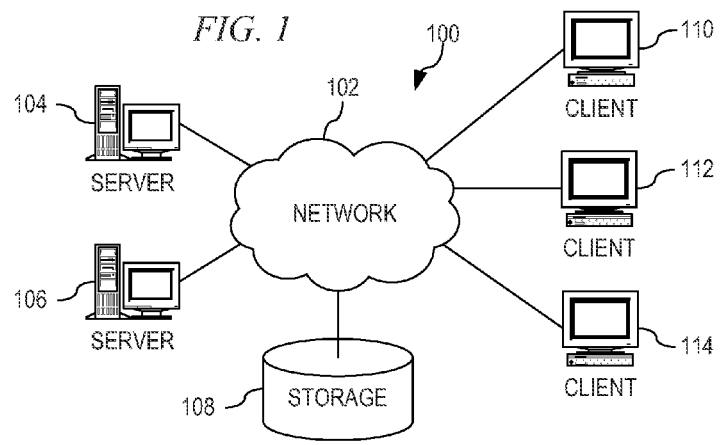
FIG. 1 depicts a pictorial representation of an example distributed data processing system in which aspects of the illustrative embodiments may be implemented.
Figure 2:
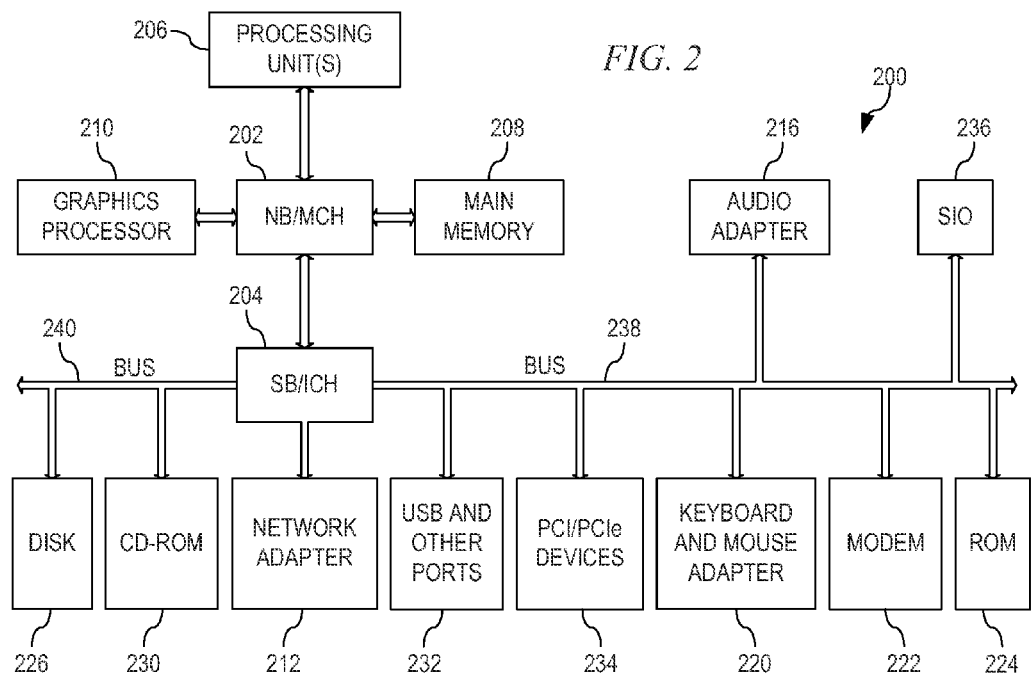
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication Jinks, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a block diagram illustrating a logical partitioned data processing system with leased fragmented memory between processes in accordance with an illustrative embodiment. A first logical partition 340 runs processes 332, 334, 336. Logical partition 340 has memory manager 320 that manages memory 310. A second logical partition 380 runs processes 372, 374, 376. Logical partition 380 has memory manager 360 that manages memory 350.

In the examples depicted hereafter, the term "memory" is used for simplicity. However, the mechanisms of the illustrative embodiments may manage memory, virtual memory, disk storage, or any form of storage or combinations of volatile memory and non-volatile storage. For instance, virtual memory itself may comprise a combination of volatile memory and non-volatile storage.

In the depicted example, processes 332, 334, 336 may request memory from memory manager 320, which allocates blocks of memory 310 to processes 332, 334, 336. Because of fragmentation, processes 332, 334, 336 may have portions of memory 310 that are unusable, represented as fragmented memory 312. While each individual fragment of memory may be too small to be usable for a given process, the collective fragmented memory 312, which likely is not contiguous memory, may be re-apportioned to form virtual memory or file system blocks to be allocated to processes in the same or a different logical partition.

In accordance with an illustrative embodiment, memory manager 320 includes fragmented memory manager 322 that is configured to manage fragmented memory 312 to lease unusable fragments from the owners of the memory and, in turn, sub-let portions of fragmented memory 312 for use by other processes or owners.

In the depicted example, memory manager 360 in logical partition 380 includes fragmented memory manager 362, which is configured to lease fragmented memory from fragmented memory manager 322 on behalf of one or more of processes 372, 374, 376. Thus, fragmented memory manager 322 may add leased memory 352 from fragmented memory 312 to memory 350 to temporarily expand the amount of available memory beyond the capacity of memory 350.

In one example embodiment, fragmented memory manager 322 and fragmented memory manager 362 may be identical, both being configured to lease in and lease out fragmented memory. In an alternative embodiment, fragmented memory manager 322 may be configured only to lease out fragmented memory to processes within the same or different logical partitions. In one embodiment, fragmented memory manager 362 may be configured to lease in fragmented memory without the capability of leasing out fragmented memory.

In the illustrative embodiments, to "lease" is to share under some predefined terms. In the depicted example, use of the term "lease" does not necessarily imply that memory is shared in exchange for an amount of monetary benefit, although such an embodiment is within the scope of this disclosure. In one illustrative embodiment, the predefined terms may indicate an infinite lease, a time-bound lease, or a lease based on other meta-data. At the expiration of a lease, fragmented memory manager 322 or fragmented memory manager 362, or both, may automatically renew the lease or may terminate the lease to reclaim the memory.

In another example embodiment, processes 332, 334, 336 may lease out any portion of memory that a given process determines is not needed for a predetermined period of time, rather than only leasing out unusable fragments. This allows other processes to borrow (lease-in) a portion of memory for a fixed amount of time when it is known that the portion of memory will only be needed for that fixed amount of time.

FIG. 4 is a block diagram depicting a mechanism for leasing fragmented storage between processes in accordance with an illustrative embodiment. The mechanism for leasing fragmented storage between processes comprises fragment detector 404, fragment lease manager 408, and fragment pool manager 414.

Fragment detector 404 is programming logic that is embedded within virtual memory/file or disk sub-system manager 402 to detect the presence of unusable fragments. For example, in case of a hard disk, a chunk of memory that is lower than the page and/or block size could be identified as a fragment. In a Java™ heap, the Java™ virtual machine (JVM) may identify virtual memory addresses that would not satisfy observed allocation requests.

In one example embodiment, fragment detector 404 may identify portions of memory that are usable but not needed. Thus, an application process or sub-system logic may lease out portions of memory while they are not needed and then reclaim those portions of memory when they are needed.

In an example embodiment, virtual memory/file or disk sub-system manager 402 may trigger fragment detector 404 when a storage allocation fails due to lack of memory or any other configurable events rather than always running. Thus, fragment detector 404 may have zero overhead when memory is abundant.

One aspect is what happens if a fragment is no longer a fragment. For example, a fragment of 300 bytes may be wedged between two 1000 byte allocated space. Then, when one or both of the 1000 byte allocation is freed, the unusable fragment becomes usable. In the illustrative embodiment, the fragment detector would no longer report such a fragment as unusable. If that memory has been let out, the fragment manager may need to hold onto the 300 bytes until the current lease expires.

Fragment lease manager 408 is a sub-program that exists within each application or sub-system logic 406 that is configured to lease out fragments from its memory or managed segments to fragment pool manager 414 and is configured to lease in memory from fragment pool manager 414. Lease-in manager 410 and lease-out manager 412 may be separate programs, if needed, allowing for some applications or sub-systems to do one and not the other.

Fragment pool manager 414 is an external sub-system that collects addresses of fragmented memory or file system areas and constructs virtual memory/file system blocks that can be allocated to other programs. Fragment pool manager 414 works with a memory management system, such as kernel memory manager in UNIX® operating system. "UNIX" is a registered trademark of The Open Group in the United States, other countries, or both. Fragment pool manager 414 is configured to lease in memory from lease capable programs or sub-systems and lease out memory/file system blocks to programs in need.

FIG. 5 is a block diagram depicting a mechanism in a virtual machine for leasing fragmented storage between processes in accordance with an illustrative embodiment. Java™ virtual machine (JVM) 506 runs Java™ threads 502, 504. JVM 506 has heap 508 and garbage collection 512. JVM 506 and garbage collection 512 are configured to analyze and detect fragmentation, which may be an externally triggered process or internally triggered based on a certain configuration. JVM 506 marks part or all of those fragments in fragmented memory 510 as allocated with special meta-data that indicates it is leased out. A thread within JVM 506 governs fragmented memory 510 and interacts with fragmented memory manager 514 that may use a "Distributed Garbage Collection" like system to lease out the memory for external use. JVM 506 comprises fragmented memory manager 514, which includes lease-in manager 516 and lease-out manager 518.

Other JVMs that need heap beyond the system limit, or even under normal circumstances, may choose to lease memory from fragmented memory manager 514. Because the owning JVM still controls the memory, all accesses, including read/write operations, may be routed through that JVM. This allows sharing of memory only between compatible JVMs. However, if fragmented memory manager 514 converts fragmented memory 510 is made into a shared-memory-like resource, then fragmented memory manager 514 may control all accesses, even accesses from other operating environments. JVM 506 may comprise an application programming interface (API) 520 to allow other programs to communicate with lease-in manager 516 and lease-out manager 518.

In the depicted example, fragmented memory manager 514 may perform the functions described above with respect to fragment lease manager 408 and fragment pool manager 414 in FIG. 4. Alternatively, fragmented memory manager 514 may perform functions of a fragment lease manager and communicate with a fragment pool manager (not shown) that is external to JVM 506.

Figure 6:
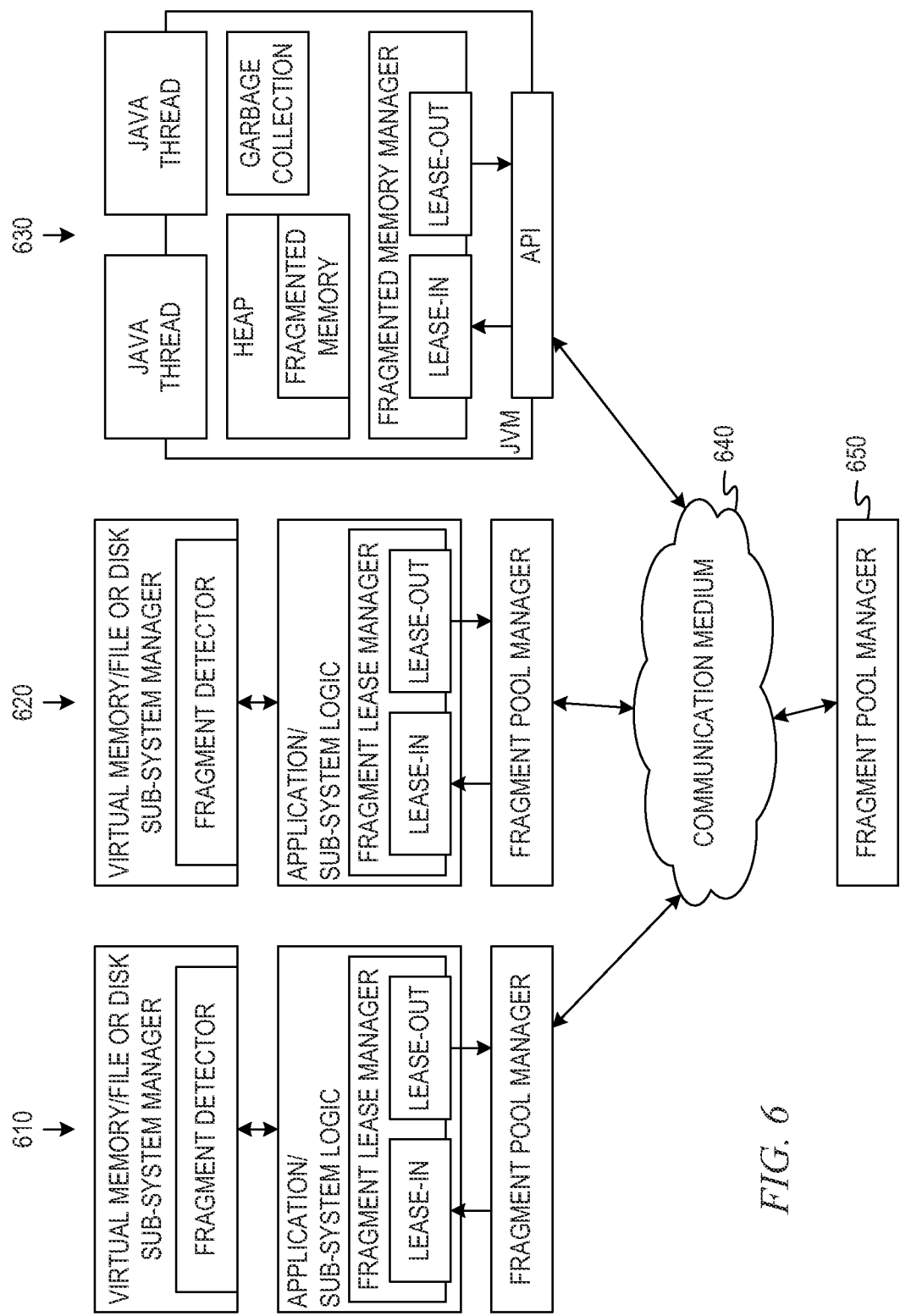
FIG. 6 is a diagram illustrating leasing fragmented storage between processes in a distributed computing environment in accordance with an illustrative embodiment.

FIG. 6 is a diagram illustrating leasing fragmented storage between processes in a distributed computing environment in accordance with an illustrative embodiment. Processing environment 610, processing environment 620, and processing environment 630 connect to communication medium 640. Processing environment 610 represents one or more applications or processes or sub-system logic running in a first logical partition and/or operating system. Processing environment 620 represents one or more applications or processes or sub-system logic running in a second logical partition and/or operating system. Processing environment 630 represents one or more Java™ programs, processes or threads running in a Java™ virtual machine.

Processes running in processing environment 610 may lease out memory to other processes in the same processing environment 610 or to processes running in processing environment 620 or processing environment 630. That is, the fragment pool manager of processing environment 610 may communicate with the fragment pool manager of processing environment 620 or the fragmented memory manager of processing environment 630 via communication medium 640. Similarly, processes running in processing environment 620 may lease in or lease out memory to processes in processing environment 610 or processing environment 630, and processes running in processing environment 630 may lease in or lease out memory to processes in processing environment 610 or processing environment 620.

Communication medium may be a symmetric multi-processing bus, a computer bus, such as a Peripheral Component Interconnect (PCI) bus, a switched fabric, a network, such as an Ethernet network, a wireless network, or the Internet. Thus, the mechanisms of the illustrative embodiments may allow processes to lease in or lease out portions of memory within a physical processor, within a multiple processor data processing system, within a network, or within a cloud computing environment.

As seen in FIG. 6, the distributed computing environment includes a plurality of fragment pool managers. These fragment pool managers may collaborate in a peer-to-peer configuration or, alternatively, in a master-slave configuration. In one example embodiment, one processing environment may act as the master while the remaining processing environments act as slave fragment pool managers. In another example embodiment, a master fragment pool manager 650 may communicate with a plurality of slave fragment pool managers in processing environments 610, 620, and 630. Whether the distributed computing environment uses a peer-to-peer configuration or a master-slave configuration, the distributed computing environment of FIG. 6 may allow diverse storage managers to act together. The ratio of pool managers to lease managers need not be one-to-one. Therefore, in yet another example environment, processing environments 610, 620, and 630 may not have fragment pool managers, and the fragment lease managers of processing environments 610, 620, and 630 may communicate directed with a central fragment pool manager 650.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (anon-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
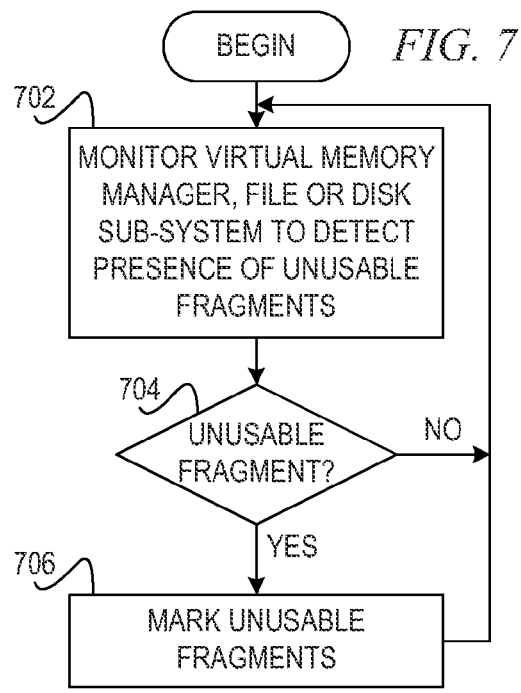
FIG. 7 is a flowchart illustrating operation of a fragment detector in accordance with an illustrative embodiment.

FIG. 7 is a flowchart illustrating operation of a fragment detector in accordance with an illustrative embodiment. Operation begins, and the fragment detector monitors a virtual memory manager or file or disk sub-system to detect presence of unusable fragments (block 702). The fragment detector determines whether an unusable fragment is detected (block 704). If the fragment detector does not detect an unusable fragment, operation returns to block 702 to monitor the virtual memory manager or file or disk sub-system. If the fragment detector does detect an unusable fragment in block 704, the fragment detector marks the unusable fragments (block 706). Thereafter, operation returns to block 702 to monitor the virtual memory manager or file or disk sub-system.

FIG. 8 is a flowchart illustrating operation of a fragment lease manager in accordance with an illustrative embodiment. Operation begins, and the fragment lease manager determines whether a process to which the fragment lease manager is associated requests to lease out memory (block 802). If the fragment lease manager determines that it is to lease out memory, the fragment lease manager identifies unusable fragments to the fragment pool manager (block 804), sets lease terms (block 806, and manages the lease (block 808). Thereafter, operation returns to block 802 to determine whether a process requests to lease out memory.

If the fragment lease manager determines that a process does not request to lease out memory, the fragment lease manager determines whether the process to which the fragment lease manager is associated requests to lease in memory (block 810). If the fragment lease manager determines that it is to lease in memory, the fragment lease manager requests memory from the fragment pool manager (block 812). In one example embodiment, the fragment lease manager(s) from which the memory fragments leased manage the lease. Thereafter, operation returns to block 802 to determine whether a process requests to lease out memory.

If the fragment lease manager determines that a process does not request to lease in memory in block 810, the fragment lease manager determines whether a lease that the fragment lease manager is managing expires (block 814). If a lease does not expire in block 814, operation returns to block 802 to determine whether a process requests to lease out memory.

If the fragment lease manager determines that a lease expires in block 814, the fragment lease manager determines whether to renew the lease (block 816). The fragment lease manager may make this determination based on the terms of the lease set in block 806. As described above, these terms may include a time limit for the lease of memory fragments. The fragment lease manager may determine whether the owning process needs to reclaim the memory or whether the lessee process still needs the memory. The terms of the lease may also include an indication that the process may automatically renew the lease. The terms of the lease may include an indication that the owning process may reclaim the memory at the conclusion of the lease. The fragment lease manager may also make this determination based on a policy data structure. If the fragment lease manager decides to renew the lease, the fragment lease manager resets the lease terms (block 818). Then, operation returns to block 808 to manage the lease.

If the fragment lease manager decides not to renew the lease in block 816, the fragment lease manager instructs lessee process to relinquish the memory (block 820) and notifies the fragment pool manager of the freed fragmented memory (block 822). Thereafter, operation returns to block 802 to determine whether a process requests to lease out memory.

Figure 9:
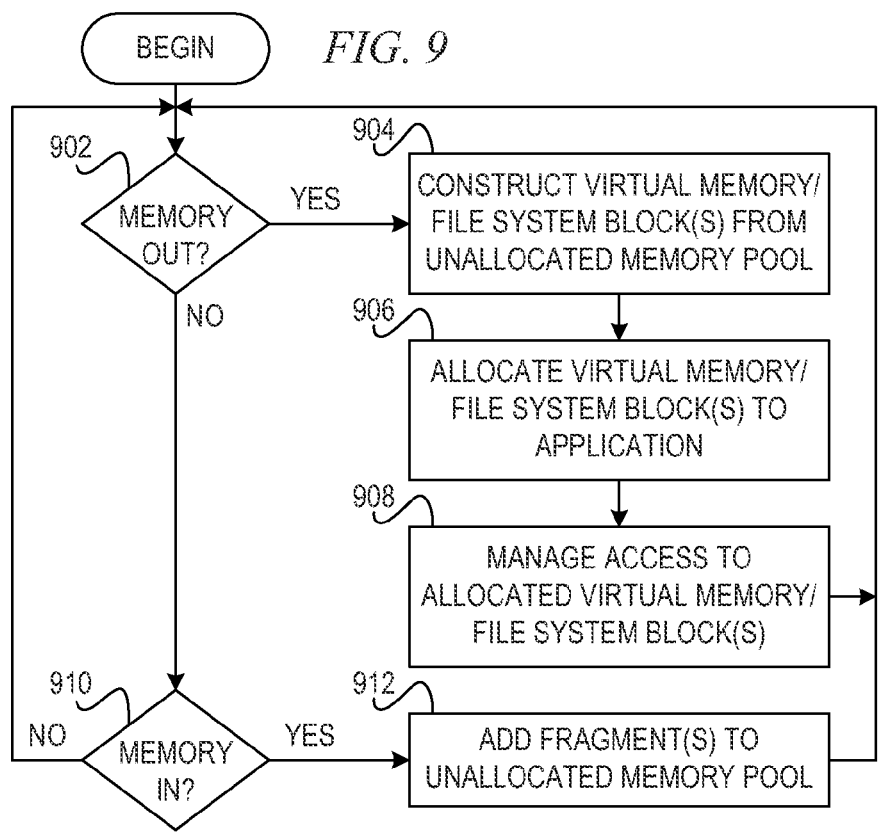
FIG. 9 is a flowchart illustrating operation of a fragment pool manager in accordance with an illustrative embodiment.

FIG. 9 is a flowchart illustrating operation of a fragment pool manager in accordance with an illustrative embodiment. Operation begins, and the fragment pool manager determines whether the fragment pool manager is to allocate memory out to an application (block 902). The fragment pool manager may make this determination based on whether fragmented memory managed by the fragment pool manager is being leased by a process associated with the application. If the fragment pool manager is to allocate memory, the fragment pool manager constructs virtual memory or file system block(s) (block 904), allocates the virtual memory/file system block(s) to the application (block 906), and manages access to the allocated virtual memory/file system block(s) (block 908). Thereafter, operation returns to block 902 to determine if the fragment pool manager is to allocate memory out to a process.

If the fragment pool manager is not to allocate memory out in block 902, the fragment pool manager determines whether it is to receive memory in from an application associated with the fragment pool manager (block 910). The fragment pool manager may make this determination based on one or more unusable memory fragments being detected or based on a lease expiring. If the fragment pool manager is to receive fragments of memory in, the fragment pool manager adds the fragments) to the unallocated memory pool (block 912). Thereafter, or if the fragment pool manager determines that it is not to receive memory in, operation returns to block 902 to determine if the fragment pool manager is to lease out memory.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for leasing fragmented storage between processes. The mechanism comprises a fragmented memory manager associated with instances of virtual memory managers to provide a pool of memory that may lease from the owners of the memory and in turn sub-let the memory for use by other processes or owners. The mechanism allows programs to operate under normal conditions until fragmentation sets. A different memory manager leases those fragmented memory blocks from processes to create a virtually contiguous block of memory that it can sub-lease to processes in need of temporary expansion beyond the memory available for the processes under normal circumstances.

With the mechanisms of the illustrative embodiments, programs can continue to function beyond their otherwise normal memory limits. Instead of spending normal application machine cycles avoiding fragmentation, the mechanisms of the illustrative embodiments allow applications to execute under normal mode, while utilizing idle cycles to detect and organize fragmented memory. The pool of fragmented memory transcends process or file system boundaries, allowing more effective use of memory across the system. The only overhead for individual processes is the mechanism to detect unusable fragments and marking them for leasing out to the fragment pool manager. Actual use of the fragmented memory is governed by the fragment pool manager, which can be external to the process owning the fragment, hence minimizing the overhead on individual processes providing the fragments. By allowing fragments to be used only as a last resort and making that use time bound, the latency of accessing such memory is only incurred during that time and only for those memory blocks.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for leasing fragmented storage between processes, the method comprising:
   responsive to a fragment of storage owned by a first process being marked as unusable, adding, by a fragment pool manager running in the data processing system, the fragment of storage to an unallocated storage pool;
   responsive to a request to lease a portion of storage from a second process, constructing, by the fragment pool manager, one or more blocks of storage from the unallocated storage pool, wherein the one or more blocks of storage comprise the fragment of storage owned by the first process;
   allocating, by the fragment pool manager, the one or more blocks of storage to the second process; and
   managing, by the fragment pool manager, access to the one or more blocks of storage by the second process.

2. The method of claim 1, further comprising:
   responsive to detecting, by a fragment detector running in a virtual memory manager or file or disk sub-system in the data processing system, an unusable fragment, having a size that is less than a block size used by the first process, within a portion of storage allocated to the first process, marking the unusable fragment as being unusable.

3. The method of claim 1, further comprising:
responsive to detecting, by a fragment detector running in a virtual memory manager or file or disk sub-system in the data processing system, that a given fragment of storage is not needed for a period of time, marking the given fragment of storage as being unusable.

4. The method of claim 1, wherein the fragment pool manager allocates the one or more blocks of storage to the second process under terms of a lease, the method further comprising:
managing, by a fragment lease manager, the lease of the one or more blocks of storage by the second process.

5. The method of claim 4, wherein the lease comprises a time-bound lease, the method comprising:
responsive to the lease expiring, determining, by a fragment lease manager, whether to renew the lease;
responsive to a determination to not renew the lease, reclaiming the one or more blocks of storage; and
adding, by the fragment pool manager, the reclaimed one or more blocks of storage to the unallocated storage pool.

6. The method of claim 4, further comprising:
responsive to a determination to renew the lease, re-setting, by the fragment lease manager, the terms of the lease.

7. The method of claim 1, wherein the second process runs in a different logical partition within the data processing system than the first process.

8. The method of claim 1, wherein the second process runs in a different data processing system than the first process.

9. The method of claim 1, wherein the second process runs in a virtual machine.

10. The method of claim 1, wherein the fragment of storage is a portion of virtual memory.

11. The method of claim 1, wherein the fragment of storage is a portion of disk storage.

12. The method of claim 1, wherein the fragment pool manager communicates with a fragment pool manager associated with the second process via a network.

13. A computer program product comprising a computer readable storage medium having a computer readable program stored therein, wherein the computer readable program, when executed on as computing device, causes the computing device to:
responsive to a fragment of storage owned by a first process being marked as unusable, add, by a fragment pool manager running in the computing device, the fragment of storage to an unallocated storage pool;
responsive to a request to lease a portion of storage from a second process, construct, by the fragment pool manager, one or more blocks of storage from the unallocated storage pool, wherein the one or more blocks of storage comprise the fragment of storage owned by the first process;
allocate, by the fragment pool manager, the one or more blocks of storage to the second process; and
manage, by the fragment pool manager, access to the one or more blocks of storage by the second process.

14. The computer program product of claim 13, wherein the computer readable program further causes the computing device to:
responsive to detecting, by a fragment detector running in a virtual memory manager or file or disk sub-system in the computing device, art unusable fragment, having a size that is less than a block size used by the first process, within a portion of storage allocated to the first process, mark the unusable fragment as being unusable.

15. The computer program product of claim 13, wherein the fragment pool manager allocates the one or more blocks of storage to the second process under terms of a lease, wherein the lease comprises a time-bound lease, and wherein the computer readable program further causes the computing device to:
responsive to the lease expiring, determine, by a fragment lease manager, whether to renew the lease;
responsive to a determination to not renew lease, reclaim the one or more blocks of storage; and
add, by the fragment pool manager, the reclaimed one or more blocks of storage to the unallocated storage pool.

16. The computer program product of claim 13, wherein the computer readable program is stored in a computer readable storage medium in a data processing system and wherein the computer readable program was downloaded over a network from a remote data processing system.

17. The computer program product of claim 13, wherein the computer readable program is stored in a computer readable storage medium in a server data processing system and wherein the computer readable program is downloaded over a network to a remote data processing system for use in a computer readable storage medium with the remote system.

18. An apparatus in a computing device, comprising:
a processor; and
a memory coupled to the processor, wherein the memory comprises instructions which, when executed by the processor, cause the processor to:
responsive to a fragment of storage owned by a first process being marked as unusable, add, by a fragment pool manager running on the processor, the fragment of storage to an unallocated storage pool;
responsive to a request from a second process to lease a portion of storage, construct, by the fragment pool manager, one or more blocks of storage from the unallocated storage pool, wherein the one or more blocks of storage comprise the fragment of storage owned by the first process;
allocate, by the fragment pool manager, the one or more blocks of storage to the second process; and
manage, by the fragment pool manager, access to the one or more blocks of storage by the second process.

19. The apparatus of claim 18, wherein the instructions further cause the processor to:
responsive to detecting, by a fragment detector running in a virtual memory manager or file or disk sub-system, an unusable fragment, having a size that is less than a block size used by the first process, within a portion of storage allocated to the first process, mark the unusable fragment as being unusable.

20. The apparatus of claim 18, wherein the fragment pent manager allocates the one or more blocks of storage to the second process under terms of a lease, wherein the lease comprises a time-bound lease, and wherein the instructions further cause the processor to:
responsive to the lease expiring, determine, by a fragment lease manager, whether to renew the lease;
responsive to a determination to not renew the lease, reclaim the one or more blocks of storage; and
add, by the fragment pool manager, the reclaimed one or more blocks of storage to the unallocated storage pool.

* * * * *